United States Patent [19]

Dietrich, Sr. et al.

[11] Patent Number: 4,592,294

[45] Date of Patent: Jun. 3, 1986

[54] KNIFE APPLICATOR FOR DRY AND LIQUID FERTILIZER

[75] Inventors: William J. Dietrich, Sr., Congerville; Dean A. Knobloch, Goodfield; Cary L. Sizelove, Sr., Eureka, all of Ill.

[73] Assignee: DMI, Inc., Goodfield, Ill.

[21] Appl. No.: 716,832

[22] Filed: Mar. 28, 1985

[51] Int. Cl.$^4$ ............................................. A01C 23/02
[52] U.S. Cl. ........................................ 111/7; 111/73; 111/86
[58] Field of Search ............... 111/6, 7, 73, 80, 85, 111/86

[56] References Cited

U.S. PATENT DOCUMENTS

| | | | |
|---|---|---|---|
| 2,159,652 | 5/1939 | Brunner | 111/86 X |
| 2,722,902 | 11/1955 | Hyatt | 111/7 |
| 2,764,111 | 9/1956 | Collins | 111/73 X |
| 2,768,591 | 10/1956 | James | 111/7 |
| 2,924,189 | 2/1960 | McLeod | 111/85 X |
| 3,296,985 | 1/1967 | Schelton | 111/7 |
| 3,326,152 | 6/1967 | Frantzen | 111/7 |
| 3,605,657 | 9/1971 | Brannan | 111/7 |
| 3,618,538 | 11/1971 | Brannan | 111/7 |
| 3,745,944 | 7/1973 | Yetter | 111/7 |
| 3,854,429 | 12/1974 | Blair | 111/7 |
| 3,908,567 | 6/1975 | Brannan | 111/7 |
| 4,116,139 | 9/1978 | Sauer | 111/7 |
| 4,201,142 | 5/1980 | Stump | 111/7 |
| 4,231,306 | 11/1980 | Whitehead et al. | 111/7 X |
| 4,424,757 | 1/1984 | Gibbens | 111/7 |

FOREIGN PATENT DOCUMENTS

| | | | |
|---|---|---|---|
| 153245 | 4/1952 | Australia | 111/73 |
| 244384 | 10/1960 | Australia | 111/73 |
| 80180 | 7/1949 | Fed. Rep. of Germany | 111/73 |
| 1200597 | 9/1965 | Fed. Rep. of Germany | 111/86 |
| 2109588 | 12/1971 | Fed. Rep. of Germany | 111/7 |
| 2655647 | 6/1977 | Fed. Rep. of Germany | 111/7 |
| 85685 | 8/1965 | France | 111/73 |
| 2236402 | 1/1975 | France | 111/85 |
| 65150 | 12/1919 | Sweden | 111/86 |
| 46822 | 4/1920 | Sweden | 111/86 |
| 3907 | of 1900 | United Kingdom | 111/86 |
| 127495 | 8/1959 | U.S.S.R. | 111/73 |

*Primary Examiner*—James R. Feyrer
*Attorney, Agent, or Firm*—Emrich & Dithmar

[57] ABSTRACT

An applicator for dry and liquid fertilizer includes a knife for forming a slot in the soil, a dry fertilizer-conduit mounted behind the knife and formed into a U-shaped channel with an elongated, upright slot at the rear, and a flexible hose for liquid fertilizer removably wedged in the slot and forming the rear wall of the channel. If the dry fertilizer conduit becomes plugged or restricted, the liquid fertilizer hose is removed, and a tool may be used to clear the conduit.

5 Claims, 7 Drawing Figures

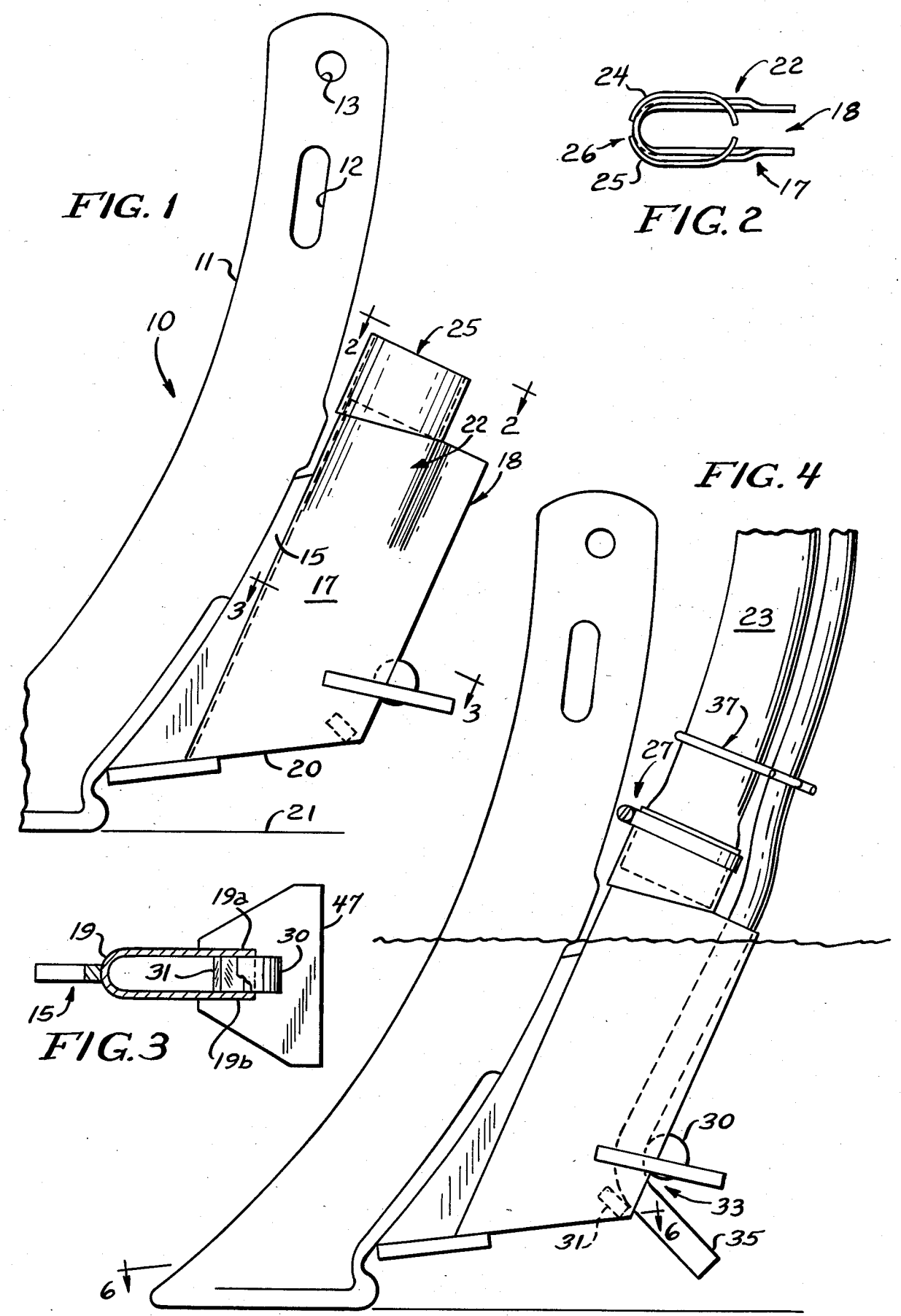

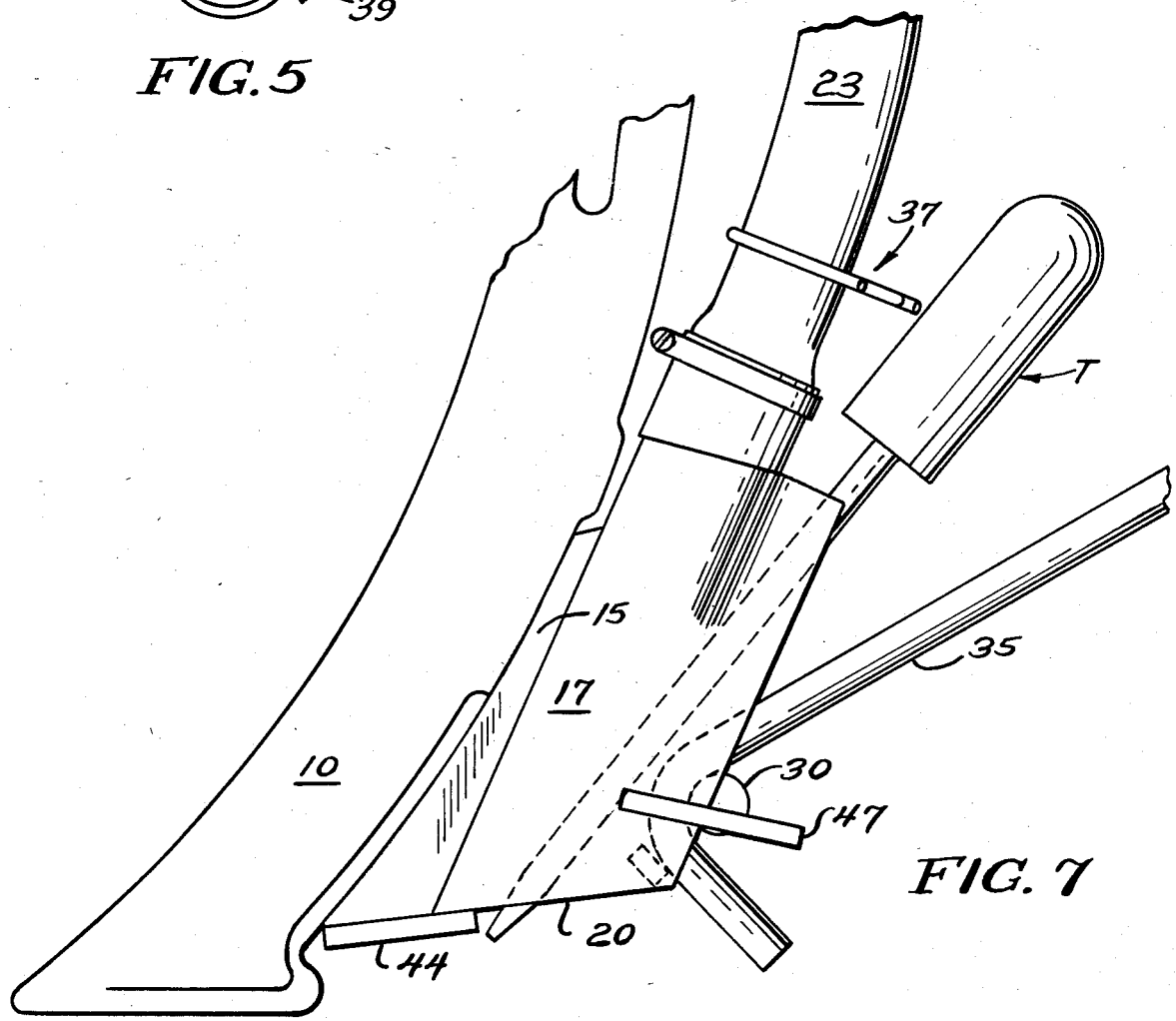

KNIFE APPLICATOR FOR DRY AND LIQUID FERTILIZER

FIELD OF THE INVENTION

The present invention relates to apparatus for applying fertilizer beneath the surface of soil, as in agricultural applications. More particularly, the invention relates to an improved knife applicator for applying dry (i.e., particulate) and liquid fertilizer simultaneously. Typically, the liquid fertilizer is in the form of anhydrous ammonia.

BACKGROUND OF THE INVENTION

In the past, when moldboard plows were widely used for primary tillage, either in the fall or the spring, dry fertilizer was normally spread on the surface of the soil before plowing; and it was buried deep in the soil after plowing, due to the nature of moldboard tillage. Burying fertilizer deep in the soil is advisable. When fertilizer is applied in the fall, the fertilizer can be leached out of the soil and carried away with surface drainage if it is not buried.

When the fertilizer is applied in the spring in preparation for planting, it is also desirable to bury it deeply in the soil because otherwise, as the soil becomes dry during the summer, the fertilizer is not available to the crop during hot, dry spells.

In recent years, many farmers have modified earlier tillage practices, and there has been a noticeable shift away from moldboard plowing because, among other things, moldboard plowing tends to increase soil erosion. As a result, fertilizer applicators have been developed for depositing the fertilizer deep in the ground— that is, in the range of 4–8 in. below the surface.

A knife applicator for agricultural use is not new. Typically, an applicator of this type includes a blade or knife located in a forward position for opening a slot or furrow of a desired depth and width. Typically, a conduit of closed cross section is then mounted behind the knife for guiding dry fertilizer into the slot formed behind the knife. Finally, a metal tube or rubber hose is mounted behind the dry fertilizer conduit for communicating anhydrous ammonia into the slot behind, and, hence, on top of, the dry fertilizer. Conventionally, some means is provided to close the slot with soil so that the fertilizer, once applied, remains in the soil at the desired depth.

SUMMARY OF THE INVENTION

The applicator of the present invention includes a channel-shaped conduit mounted behind a furrow-forming knife by means of a spacer or bracket having a width substantially less than the width of the knife and orienting the conduit in a generally upright and slightly rearwardly inclined position. The conduit is formed from a single piece of sheet material, such as stainless steel, with a rounded front wall and generally flat and parallel side walls which are spaced apart at their rear edges so as to form an opening or slot extending substantially the entire height of the channel. A hose having an outer diameter slightly greater than the width of the slot at the rear of the dry fertilizer channel is wedged in the slot opening to form the rear wall or panel of the dry fertilizer conduit.

If the dry fertilizer conduit becomes clogged, as it sometimes does, either because of the cohesion of the fertilizer particles or because it becomes plugged with wet soil from the bottom, the operator simply removes the liquid fertilizer hose rearwardly out of the slot, thereby permitting the insertion of a tool such as a screwdriver to dislodge any fertilizer or mud and thereby to clear the dry fertilizer channel by loosening the clogged material which then falls under gravity to clear the channel.

Other features and improvements of the present invention will be apparent to persons skilled in the art from the following detailed description of a preferred embodiment accompanied by the attached drawing wherein identical reference numerals will be used to refer to like parts in the various views.

BRIEF DESCRIPTION OF THE DRAWINGS

FIG. 1 is a fragmentary side view, taken from the left side, of an applicator constructed according to the present invention;

FIG. 2 is a top view along a slightly inclined plane illustrated by the sight line 2—2 of FIG. 1 and looking down into the dry fertilizer conduit;

FIG. 3 is a cross-sectional view of the fertilizer channel taken along the sight line 3—3 of FIG. 1

FIG. 4 is a side view of the applicator, similar to FIG. 1 but including the fertilizer hoses;

FIG. 5 is a plan view of a hose clip used to secure the liquid fertilizer hose to the dry fertilizer hose;

FIG. 6 is a cross-sectional view of the applicator taken through the sight line 6—6 of FIG. 4; and FIG. 7 is a side view of the apparatus of FIG. 4, with the knife partially broken away, and showing the liquid fertilizer hose moved out of the rear slot of the dry fertilizer conduit to facilitate insertion of the tool to clear that conduit.

DETAILED DESCRIPTION

Referring now to the drawing, and particularly to FIG. 1, reference numeral 10 generally designates a knife. The knife 10 has a generally curved leading edge 11 which may be hardened and provides the cutting edge for opening a slot or furrow. The knife 10 includes an upper slot 12 and a hole 13 for receiving bolts for mounting it to a shank. The knife 10 is conventional and may have a cross-sectional shape as seen in FIG. 6.

A mounting bracket or web, cut from flat stock in the tapering shape shown in FIGS. 1, 4 and 7 and designated 15 is welded to the rear of the lower portion of the knife 10. The web 15 extends parallel to the direction of travel of the knife, and it connects the knife 10 to a dry fertilizer conduit generally designated 17.

The conduit 17 is formed in the shape of a U-shaped channel, as best seen in FIG. 6, having a rear opening or slot generally designated 18 extending substantially its entire length and oriented in a generally upright direction.

The conduit 17, as best seen in FIGS. 3 and 6, has a convexly curved leading surface 19 and flat, generally parallel side walls 19a and 19b. The curved front wall facilitates movement through the slot formed by the knife and avoids any sharp edges which might collect debris or soil and increase the force required to pull it. In addition to the rear slot 18, the conduit 17 is open at its top (to form an inlet opening) and at its bottom (to form a discharge opening), the latter being cut at an angle as seen at 20 in FIG. 1 so that when the conduit 17 is in its operating position, the bottom edge 20 is inclined slightly upwardly and rearwardly to facilitate discharge of the dry fertilizer onto the bottom 21 of the furrow or slot formed by the knife. This incline also helps prevent moist soil from plugging the bottom of conduit 17.

The upper, forward portion of the dry fertilizer conduit 17 is flared outwardly in the region designated 22, as seen in FIG. 1 and 2 so that the distance between the walls 19A, 19B in the region 22 is slightly greater than the distance between the walls 19A, 19B in the lower portion of the dry fertilizer conduit 17. The purpose of this is to complete the transition between the flexible feed conduit or hose 23 (see FIG. 4) which feeds dry fertilizer to the conduit 17 and the narrower width of the conduit 17.

A pair of formed members 24, 25 are welded to the forward portion of the upper edge of the dry fertilizer conduit 17 immediately above the enlarged portion 22 of the dry fertilizer conduit. The members 24, 25 are spaced from one another as seen in FIG. 2 and, when thus assembled to the conduit, form an oblong receptacle generally designated 26 for receiving the hose 23. The hose 23 is squeezed to fit inside the members 24, 25 and is secured by means of a hose clamp seen at 27 in FIG. 4. Thus, the hose provides the transformation from its own normally round cross-section to the elongated, narrow shape of the metal conduit.

A stop or slug 30 in the form of a disc cut from a solid rod is welded to the inner surfaces of the side walls 19a, 19b of the dry fertilizer conduit as seen in FIGS. 3 and 4; and a flat piece 31 is similarly welded to the inner surfaces of these side walls at a location below and slightly in front of the stop 30. The stop 30 and flat member 31 are spaced apart to provide an opening generally designated 33 for the lower portion of a flexible plastic hose 35 which is a conduit for the liquid fertilizer. The upper portion of the hose 35 is releasably secured to the larger hose 23 for dry fertilizer by means of a clip generally designated 37 and seen better in FIG. 5.

The clip 37 includes a larger forward portion 38 in the form of a ring and adapted to fit around the dry fertilizer hose 23. The ring 38 may be spread apart at 39 for that purpose. Behind the ring 38 is a smaller ring-shaped portion 40 adapted to receive the liquid fertilizer hose 35; and the portion 40 may be spread by pulling a tab 41 to the rear to facilitate removal of the liquid fertilizer hose, as seen in FIG. 7.

Referring to FIG. 7, if the dry fertilizer in the conduit 17 sticks or if wet soil enters the discharge opening 20 and plugs or restricts the flow of fertilizer, the liquid fertilizer hose 35 may simply be removed from the clip 37 and moved rearwardly, as seen in FIG. 7. This enables a screwdriver or other tool, T, to be placed directly into the conduit 17 along substantially the entire rear slot 18 to dislodge any obstruction which, once freed, falls under gravity to clear the conduit.

A flat metal piece 44 having, when viewed from the top, a truncated shape best seen in FIG. 6 is welded to the bottom of the web 15 and to the bottom of the front portion of the dry fertilizer conduit 17, as seen in FIGS. 6 and 7. The purpose of part 44 is to cut narrow grooves in the side walls of the furrow so that the bottom edge of the discharge opening 20 of conduit 17 does not engage soil which would have a tendency to collect and obstruct the discharge opening.

A flat sealer member 47 is welded to the outer surfaces of side walls 19a, 19b, as seen only in FIG. 3 for clarity. The member 47 extends rearwardly and downwardly as seen in FIG. 7, and it projects laterally into both walls of the furrow above the discharge aperture for the liquid ammonia. In operation, the dry fertilizer is deposited through the discharge opening 20 into the bottom of the slot. Liquid fertilizer is then deposited through the hose 35 on top of the dry fertilizer; and the sealer 47 gathers soil from the side of the furrow and direct it downwardly to cover the fertilizer thus deposited.

The dry fertilizer conduit 17 may be formed of stainless steel to reduce or eliminate any tendency of the dry fertilizer to adhere to the inside of the conduit.

Web 15 may be welded to conduit 17. Then the outer surface of conduit 17 may be hard chrome plated to prolong wear. Then web 15 may be welded to knife 10 without damage to hard chrome on conduit 17. The leading edge of conduit 19 is rounded so that it can be made slightly wider than knife 14 to additionally part the soil with a minimum of soil distrubance.

As best seen in FIG. 6, the channel formed by the conduit 17 has a width approximately equal to or slightly wider than the width of the widest portion of the furrow-forming knife 10. It is narrower than the diameter of the feed-in hose 23. The transformation in shape from the circular cross-section of the feed-in hose 23 to the generally rectangular, narrow shape of the discharge opening 20 is performed within the hose itself since it is wedged into the receptacle 26 of FIG. 2. However, the change in shape is further provided in smooth conformation by means of the enlarged portion 22 of the dry fertilizer conduit 17 to reduce any tendency to have the particles accumulate and therefore restrict or plug the conduit.

It is considered an advantage that the overall width of the knife and fertilizer conduits is made quite narrow, yet operation over a long period can be made substantially free of trouble or the need for maintenance. When clogging does occur, clearing of the conduit is greatly facilitated as described above.

Having thus disclosed in detail a preferred embodiment of the invention, persons skilled in the art will be able to modify certain of the structure which has been described and to substitute equivalent elements for those disclosed while continuing to practice the principle of the invention. It is, therefore, intended that all such modifications and substitutions be covered as they are embraced within the spirit and scope of the appended claims.

We claim:

1. A fertilizer applicator for agricultural use comprising: a knife for forming a slot in soil; a dry fertilizer conduit in the form of a channel having an upper inlet opening for receiving dry fertilizer and a lower first discharge opening for depositing fertilizer adjacent the bottom of a slot formed by said knife and defining an open slot extending along substantially the entire rear portion thereof; mounting means for mounting said dry fertilizer conduit directly behind said knife and adjacent the lower portion thereof; and a second fertilizer conduit received in said rear slot of said first conduit and engaging the inner surfaces thereof, the lower portion of said second fertilizer conduit comprising a second discharge opening for depositing a second fertilizer onto fertilizer already deposited in said slot through said first discharge aperture.

2. The apparatus of claim 1 wherein said dry fertilizer conduit means is formed from a piece of sheet metal into a generally U-shaped channel having a smoothly curved forward wall portion and generally flat, parallel side walls, the rear portions of said side walls defining said elongated slot for receiving and frictionally engaging and holding said second fertilizer conduit.

3. The apparatus of claim 2 wherein said mounting means comprises a generally flat web having a width less than working width of said knife and extending behind said knife for securing said conduit to said knife along a substantial portion of the rear surface of said knife.

4. The apparatus of claim 1 further comprising receptacle means secured to the upper portion of said dry fertilizer conduit and including first and second laterally spaced members defining a generally oblong receptacle for receiving the discharge end of a flexible dry fertilizer hose to facilitate conforming the shape of said hose to the narrow width of said dry fertilizer conduit; and clamp means for securing said receptacle to said dry fertilizer hose.

5. The apparatus of claim 1 wherein said second fertilizer conduit is a flexible hose held in said rear slot of said first conduit by friction and extending along substantially the entire length thereof and defining said second discharge opening at the lower end thereof; further comprising first and second members welded to the interior surfaces of the side walls of said dry fertilizer conduit adjacent the rear of the discharge opening thereof and spaced to receive and position the discharge opening of said flexible liquid fertilizer tube behind said first discharge opening.

\* \* \* \* \*